United States Patent
Yamashita et al.

(10) Patent No.: US 10,670,075 B2
(45) Date of Patent: Jun. 2, 2020

(54) THRUST ROLLER BEARING

(71) Applicant: JTEKT CORPORATION, Osaka-shi, Osaka (JP)

(72) Inventors: Kotaro Yamashita, Kashiwara (JP); Yoshihito Nakashima, Kariya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/407,856

(22) Filed: May 9, 2019

(65) Prior Publication Data
US 2019/0345981 A1 Nov. 14, 2019

(30) Foreign Application Priority Data
May 14, 2018 (JP) .................................. 2018-093201

(51) Int. Cl.
*F16C 33/46* (2006.01)
*F16C 19/30* (2006.01)

(52) U.S. Cl.
CPC ........ *F16C 33/4605* (2013.01); *F16C 19/305* (2013.01)

(58) Field of Classification Search
CPC ........................ F16C 19/30–32; F16C 33/4605
See application file for complete search history.

(56) References Cited

U.S. PATENT DOCUMENTS

| | | | | |
|---|---|---|---|---|
| 3,913,994 A | * | 10/1975 | Ailing | F16C 19/30 384/623 |
| 3,972,574 A | * | 8/1976 | Pitner | F16C 19/30 384/621 |
| 4,166,662 A | * | 9/1979 | Chiba | F16C 19/30 384/622 |
| 4,892,424 A | * | 1/1990 | Christenson | F16C 19/30 384/620 |
| 5,110,223 A | * | 5/1992 | Koch | F16C 19/30 384/620 |
| 5,846,001 A | * | 12/1998 | Muntnich | F16C 19/30 384/620 |
| 2017/0211621 A1 | | 7/2017 | Sadamura et al. | |

FOREIGN PATENT DOCUMENTS

| | | | | |
|---|---|---|---|---|
| JP | 2005315289 A | * | 11/2005 | ............ F16C 33/543 |
| JP | 2016-033420 A | | 3/2016 | |

OTHER PUBLICATIONS

Machine Translation of JP-2005315289-A (Year: 2005).*

* cited by examiner

*Primary Examiner* — Alan B Waits
(74) *Attorney, Agent, or Firm* — Oliff PLC (57) ABSTRACT

A thrust roller bearing includes rollers, a cage that holds the rollers in a manner that allows the rollers to roll, and a washer including a raceway surface on which the rollers roll. The washer includes a raceway portion that has the raceway surface and is disposed on a first axial side of the cage, and hook portions that extend toward a second axial side. Each of the hook portions includes a first projecting portion that extends toward the second axial side from the raceway portion, a second projecting portion that extends radially toward the rollers and toward the second axial side from an end portion of the first projecting portion on the second axial side, and a third projecting portion that further projects radially toward the rollers from an end portion of the second projecting portion on a side opposite to the first projecting portion.

6 Claims, 6 Drawing Sheets

THRUST ROLLER BEARING

INCORPORATION BY REFERENCE

The disclosure of Japanese Patent Application No. 2018-093201 filed on May 14, 2018 including the specification, drawings and abstract, is incorporated herein by reference in its entirety.

BACKGROUND OF THE INVENTION

1. Field of the Invention

The invention relates to a thrust roller bearing, in which a plurality of rollers are radially held by a cage.

2. Description of Related Art

A thrust roller bearing is interposed between a non-rotary member and a rotary member in, for example, a vehicle transmission, to smooth rotation of the rotary member while receiving a thrust in an axial direction of a bearing axis. A thrust roller bearing includes a plurality of radially-disposed rollers, an annular cage, and an annular washer. The cage has a plurality of cage pockets that hold a plurality of rollers in a manner that allows the rollers to roll. The washer is disposed on a first axial side of the cage and includes a raceway surface, on which the plurality of rollers roll, formed orthogonally to the axial direction. The washer includes a cylindrical rib and an annular disc-shaped raceway portion that includes the raceway surface. The rib extends toward a second axial side that is opposite to the first axial side from any one of an outer radial end portion and an inner radial end portion of the raceway portion.

Some type of such a thrust roller bearing is structured so as to suppress separation of the washer and the cage to facilitate handling during conveyance and assembly (see Japanese Patent Application Publication No. 2016-33420 (JP 2016-33420 A), for example). In the thrust roller bearing, a protruding hook portion, which is referred to as a staking tab, is formed by performing pressing process to an edge portion of the rib of the washer to suppress separation of the washer and the cage. The hook portion restricts axial movement of the cage in a direction in which the cage is detached from the washer, enabling suppression of separation of the washer and the cage.

However, in a process of forming the hook portion (the staking tab), there are cases in which tensile stress generated on a distal end portion of the hook portion produces a crack at a distal end of the hook portion. In particular, a thrust roller bearing having a large diameter of, for example, 80 mm or larger, has large dimensional variations and thus has a large clearance between the cage and the washer. This arises a need of setting a projecting length of the hook portion to a large value to suppress separation of the washer and the cage. However, this makes the distal end of the hook portion prone to cracking.

A crack produced in the hook portion not only leads to an appearance defect but also may cause a fragment to come off during processes such as heat treatment process. A thrust roller bearing in which a crack is produced at the distal end of the hook portion must be disposed. Hence, improvement for reduction in disposal cost is desired.

SUMMARY OF THE INVENTION

An object of the invention is to provide a thrust roller bearing including a washer in which a crack is less likely to be produced at a distal end of a hook portion that hooks a cage to suppress separation of the washer and the cage.

A thrust roller bearing according to an aspect of the invention includes a plurality of radially disposed rollers, an annular cage having a plurality of cage pockets that hold the plurality of rollers in a manner that allows the rollers to roll, and an annular washer including a raceway surface on which the plurality of rollers roll. The washer includes an annular disc-shaped raceway portion and a plurality of hook portions. The raceway portion has the raceway surface and is disposed on a first axial side of the cage. The plurality of hook portions extend toward a second axial side, the second axial side being a side axially opposite to the first axial side, from one of an outer radial end portion and an inner radial end portion of the raceway portion, the radial end portions being end portions in a radial direction, to retain the cage. Each of the hook portions includes a first projecting portion that extends toward the second axial side from the raceway portion, a second projecting portion that extends toward the rollers in the radial direction and toward the second axial side from an end portion of the first projecting portion on the second axial side, and a third projecting portion that further projects toward the rollers in the radial direction from an end portion of the second projecting portion on a side opposite to the first projecting portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention are described below with reference to FIGS. 1A to 6B. The embodiments described below are given as preferred specific examples for carrying out the invention and may specifically illustrate various preferable technical matters. It should be understood that the scope of the invention is not limited to the specific embodiments.

Figure 1A:
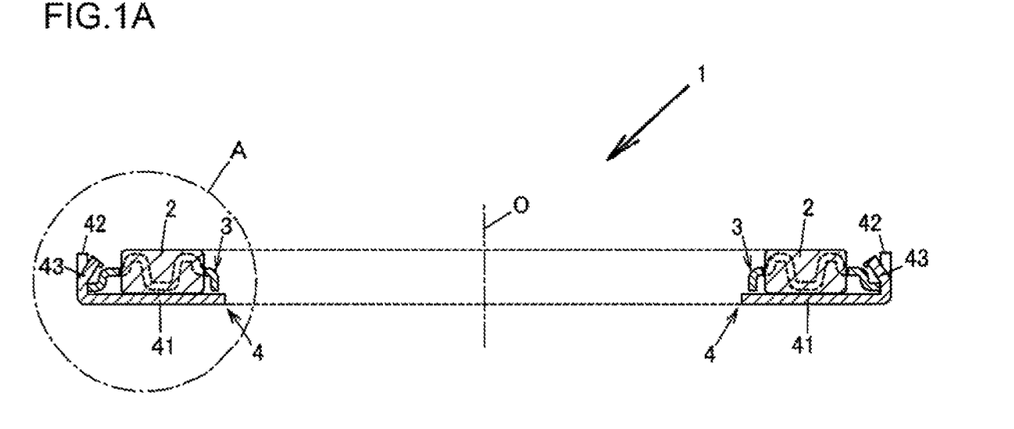
FIG. 1A is a sectional view illustrating a thrust roller bearing according to an embodiment of the invention.
Figure 1B:
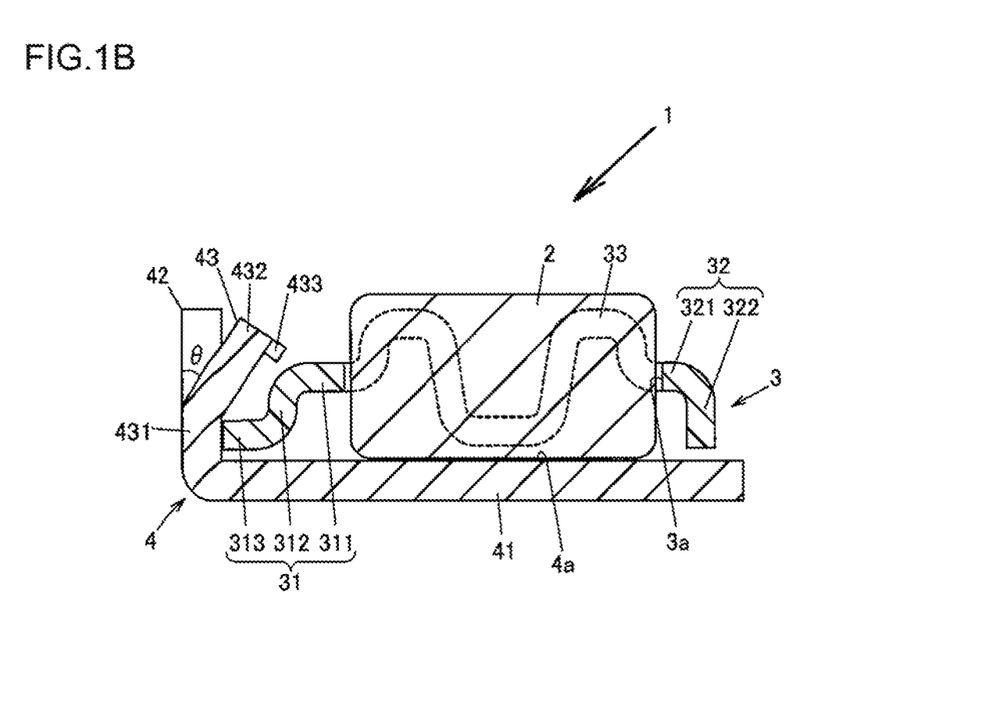
FIG. 1B is an enlarged view of a portion A of FIG. 1A.

FIG. 1A is a sectional view illustrating a thrust roller bearing 1 according to an embodiment of the invention. FIG. 1B is an enlarged view of a portion A of FIG. 1A.

As illustrated in FIG. 1A and FIG. 1B, the thrust roller bearing 1 includes a plurality of cylindrical rollers 2, an annular cage 3, and a housing washer 4. The cylindrical rollers 2 are radially disposed. The cage 3 holds the plurality of rollers 2 in a manner that allows the rollers 2 to roll. The housing washer 4 is an annular washer, on which a raceway surface 4a, on which the plurality of rollers 2 roll, is formed and disposed on a first side with respect to an axial direction (hereinafter referred to as the first axial side) (a lower side in FIG. 1A) of the cage 3.

The thrust roller bearing 1 is interposed between a non-rotary member and a rotary member in, for example, a vehicle transmission or an industrial machine. The thrust roller bearing 1 smooths rotation of the rotary member while receiving an axial thrust caused by rolling of the plurality of rollers 2 held in the cage 3.

Figure 2:
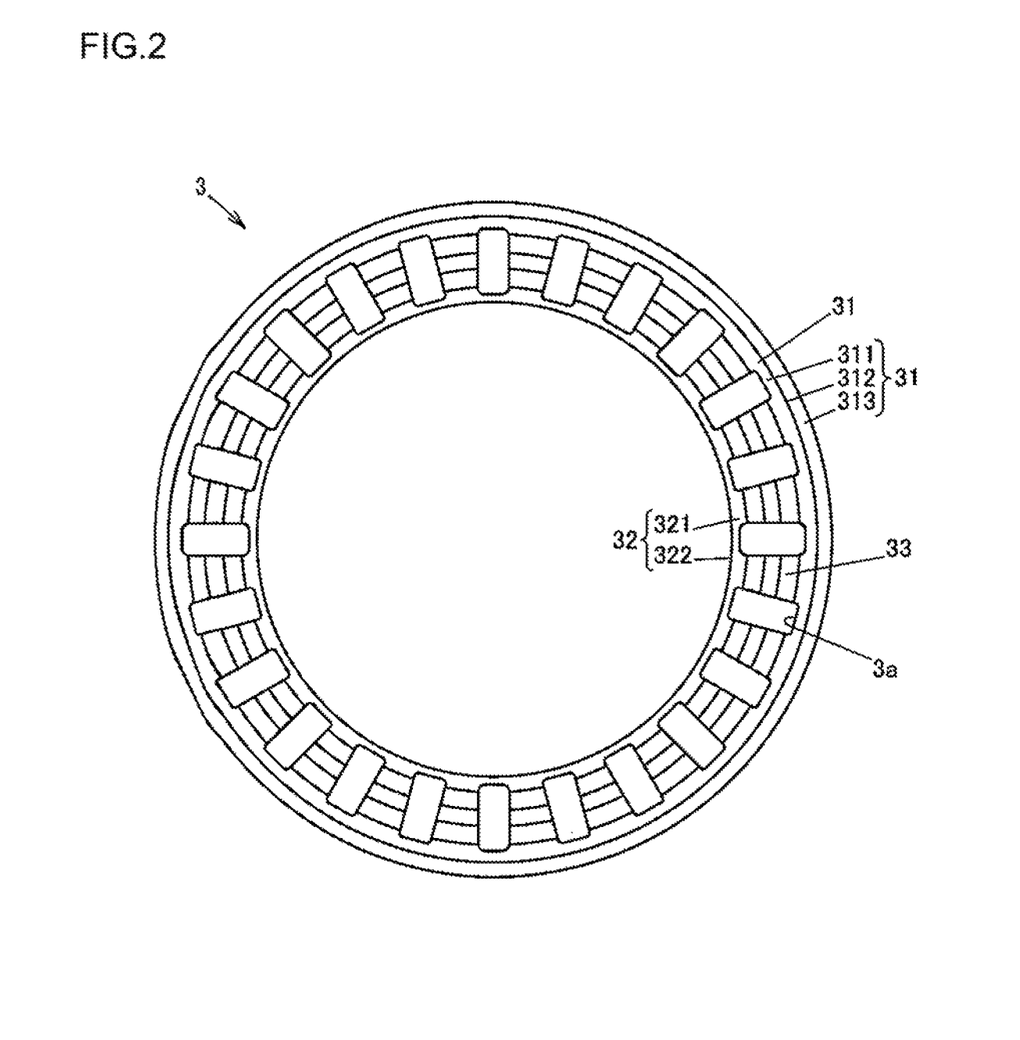
FIG. 2 is a plan view illustrating a cage.

FIG. 2 is a plan view illustrating the cage 3. As illustrated in FIGS. 1A to 2, the cage 3 integrally includes an outer annular body 31, an inner annular body 32, and a plurality of cage bars 33. The outer annular body 31 is formed radially outside of a plurality of cage pockets 3a that hold the plurality of rollers 2. The inner annular body 32 is formed radially inside of the plurality of cage pockets 3a. The cage bars 33 connect the outer annular body 31 and the inner annular body 32 in a radial direction. The outer annular body 31 and the inner annular body 32 are concentrically formed into a pair that defines the cage pockets 3a together with the cage bars 33.

The plurality of (in the embodiment, 24) cage pockets 3a, which are as many as the plurality of rollers 2, are radially formed in the cage 3 so as to hold the radially-disposed plurality of rollers 2 in a manner that allows the rollers 2 to roll. Each of the cage pockets 3a is a through hole that has a substantially rectangular shape with its long sides extending in the radial direction of the cage 3 and passes through the cage 3 in a thickness direction (the axial direction) of the cage 3.

The outer annular body 31 integrally includes an annular disc-shaped first orthogonal portion 311, a short-cylinder-shaped cylindrical portion 312, and an annular disc-shaped second orthogonal portion 313. The first orthogonal portion 311 extends orthogonally to the axial direction. The cylindrical portion 312 extends toward the first axial side (the side of the housing washer 4) from an outer radial end portion of the first orthogonal portion 311. The second orthogonal portion 313 extends radially outward from a distal end portion (an end portion on the side opposite to the first orthogonal portion 311) of the cylindrical portion 312. A connecting portion between the first orthogonal portion 311 and the cylindrical portion 312 and a connecting portion between the second orthogonal portion 313 and the cylindrical portion 312 are rounded in the section illustrated in FIG. 1B.

The inner annular body 32 integrally includes an annular disc-shaped orthogonal portion 321 and a short-cylinder-shaped cylindrical portion 322. The orthogonal portion 321 extends orthogonally to the axial direction that is parallel to a central axis O. The cylindrical portion 322 extends toward the first axial side (the side of the housing washer 4) from an inner radial end portion of the orthogonal portion 321. A connecting portion between the orthogonal portion 321 and the cylindrical portion 322 is rounded in the section illustrated in FIG. 1B.

The first orthogonal portion 311 of the outer annular body 31 and the orthogonal portion 321 of the inner annular body 32 are coaxially disposed at a same position in the axial direction. The cylindrical portion 312 of the outer annular body 31 and the cylindrical portion 322 of the inner annular body 32 extend in the same direction, i.e., in the axial direction from the orthogonal portion 311 and the orthogonal portion 321, respectively. The cage bars 33 connect the first orthogonal portion 311 of the outer annular body 31 and the orthogonal portion 321 of the inner annular body 32.

Figure 3A:
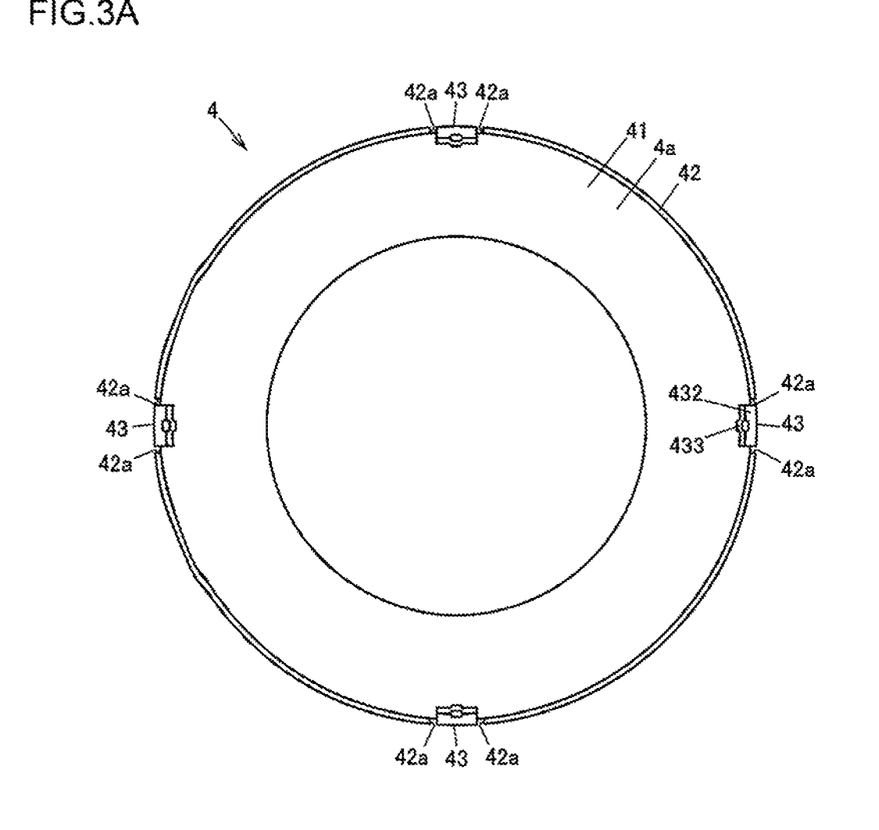
FIG. 3A is a plan view illustrating a housing washer as viewed from a side of the cage.
Figure 3B:
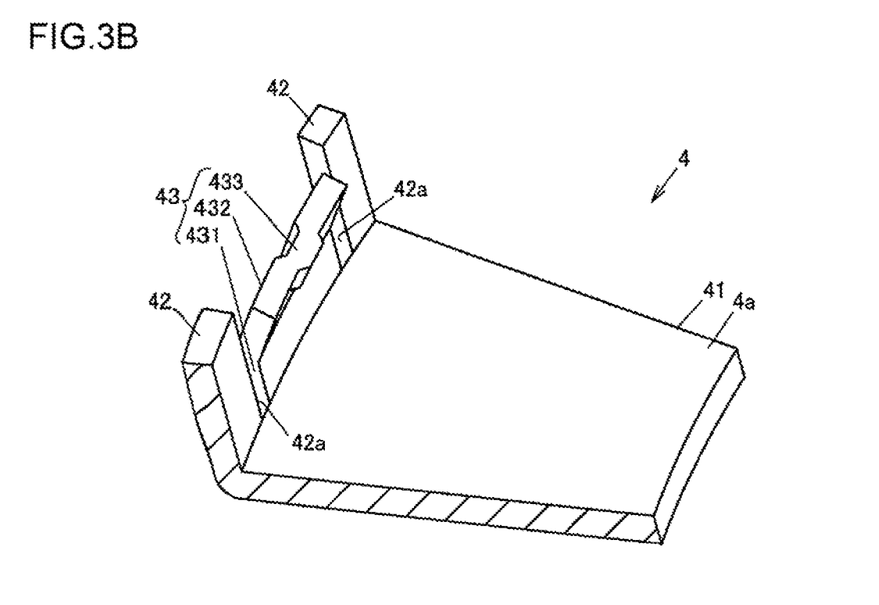
FIG. 3B is a perspective view illustrating a part of the housing washer.

FIG. 3A is a plan view illustrating the housing washer 4 as viewed from a side of the cage 3. FIG. 3B is a perspective view illustrating a part of the housing washer 4. As illustrated in FIGS. 1A, 1B, 3A, and 3B, the housing washer 4 is disposed on the first axial side (the lower side in FIG. 1A) of the cage 3. The housing washer 4 integrally includes an annular disc-shaped raceway portion 41 that is orthogonal to the axial direction and a short-cylinder-shaped rib 42 extending toward a second axial side (an upper side in FIG. 1A) from an outer radial end portion of the raceway portion 41. The raceway portion 41 is disposed on the first axial side of the cage 3 and includes the raceway surface 4a on which the plurality of rollers 2 roll, as a surface on the side of the cage 3.

Because the housing washer 4 is a member that includes the raceway surface 4a on which the rollers 2 roll, the housing washer 4 is desirably formed of a relatively hard material having a Rockwell hardness of 58 HRC or greater. The housing washer 4 is made of a carbon steel sheet of SAE 1075 or SK85, for example.

In the thrust roller bearing 1 according to the embodiment, the housing washer 4 serving as a washer includes a plurality of hook portions 43 that extend toward the second axial side (the upper side in FIG. 1A) from the outer radial end portion of the raceway portion 41 to retain the cage 3.

In the embodiment, a plurality of pairs of slits 42a spaced away from each other in a circumferential direction and each having an opening on the second axial side are provided in the rib 42. Each of the hook portions 43 is formed by plastically deforming a portion of the rib 42 between the pair of the slits 42a. In the embodiment, the number of the hook portions 43 is four (four pairs of the slits 42a), and the hook portions 43 are equally spaced away from each other in the circumferential direction. Note that the number and a circumferential position of the hook portions 43 are not limited thereto.

Each of the hook portions 43 is formed by bending a distal end portion of the rib 42 between the pair of the slits 42a radially inward and applying staking to an edge portion of the bent portion. More specifically, the hook portion 43 includes a first projecting portion 431, a second projecting portion 432, and a third projecting portion 433. The first projecting portion 431 extends toward the second axial side from the raceway portion 41. The second projecting portion 432 extends radially inward (toward the rollers 2) and toward the second axial side from an end portion of the first projecting portion 431 on the second axial side. The third projecting portion 433 further extends radially inward (toward the rollers 2) from an end portion of the second projecting portion 432 on the side opposite to the first projecting portion 431.

The first projecting portion 431 is located radially outside of an outer radial end portion (the second orthogonal portion 313 of the outer annular body 31) of the cage 3, and guides rotation of the cage 3 together with the rib 42. In the case where, for example, the first projecting portion 431 is omitted and the hook portion 43 is formed by bending the rib 42 at its basal end portion, the cage 3 may be caught between the hook portion 43 and the raceway portion 41 and thus may cause malfunction. Accordingly, by providing the first projecting portion 431, occurrence of a situation where the cage 3 is caught between the hook portion 43 and the raceway portion 41 can be reduced.

The second projecting portion 432 is a portion inclined radially inward with respect to the axial direction. By forming the second projecting portion 432, a projecting length of the hook portion 43 in a radially inward direction from the rib 42 can be increased. This enables increase in the entire projecting length of the hook portion 43 in the radially inward direction even when the projecting length of the third projecting portion 433 in the radially inward direction is reduced. An inclination angle θ of the second projecting portion 432 with respect to the axial direction is, for example, 30 degrees. A preferred range of the inclination angle θ is between 20 degrees and 45 degrees, both inclusive.

The third projecting portion 433 is formed by plastically deforming the edge portion of the second projecting portion 432 by, for example, what is typically referred to as staking that deforms a considerably small portion by crimping. Only the inward inclination of the second projecting portion 432 may be insufficient to prevent detachment of the cage 3 from the housing washer 4 when the hook portions 43 are elastically deformed. However, the third projecting portion 433 makes the cage 3 less likely to detach from the housing washer 4.

The third projecting portion 433 is formed by deforming a distal end portion (the end portion on the side opposite to the first projecting portion 431) and a circumferentially center portion of the second projecting portion 432 such that the distal end portion and the center portion project in a direction (radially inward and toward the first axial side) orthogonal to the direction in which the second projecting portion 432 extends. The third projecting portion 433 retains the cage 3 when the cage 3 is nearly detached from the housing washer 4 due to elastic deformation of the hook portion 43. When the cage 3 is nearly detached from the housing washer 4, the third projecting portion 433 is pressed against the cage 3 by an elastic deformation force (recovery force) of the hook portion 43. Thus, the projecting length of the third projecting portion 433 from the second projecting portion 432 may be small.

Figure 4A:
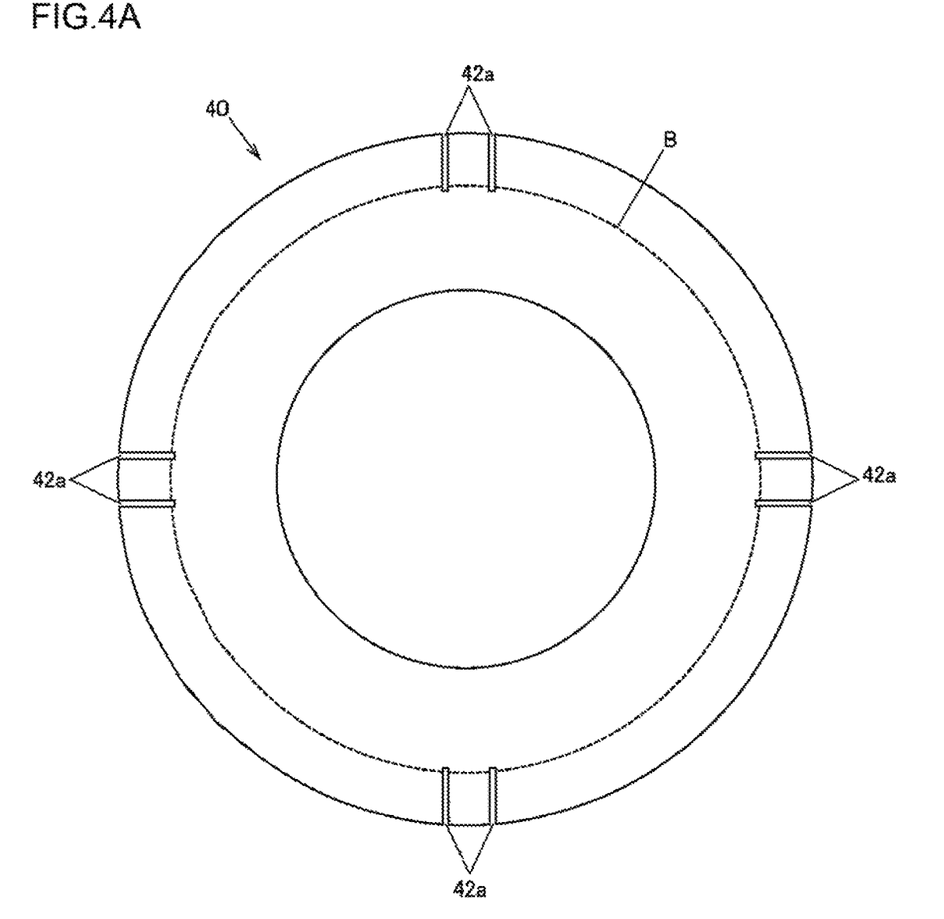
FIG. 4A is an explanatory drawing illustrating a method for manufacturing the housing washer.
Figure 4B:
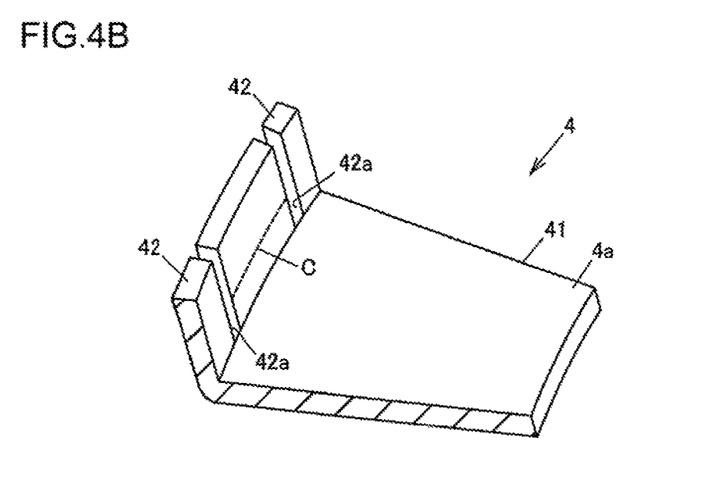
FIG. 4B is an enlarged view of a portion of 42 of FIG. 4A.
Figure 5A:
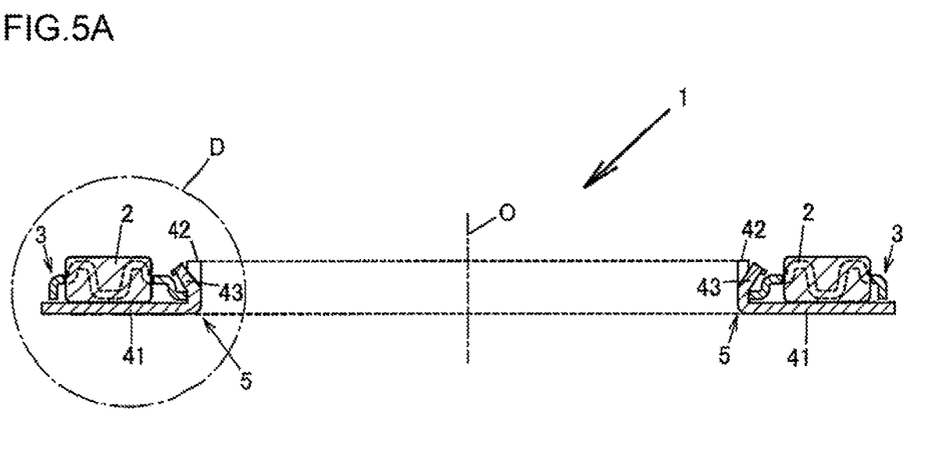
FIG. 5A is a sectional view illustrating a thrust roller bearing according to a modification of the invention.
Figure 5B:
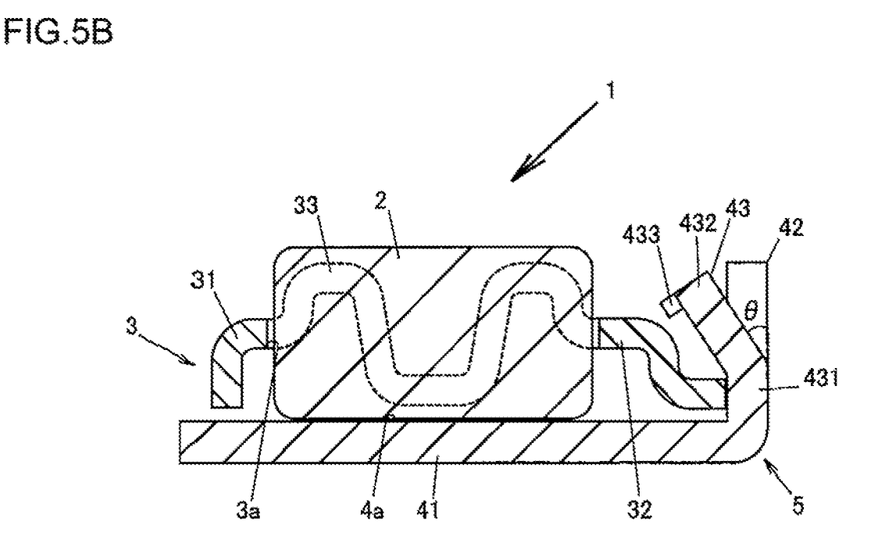
FIG. 5B is an enlarged view of a portion D of FIG. 5A.
Figure 6A:
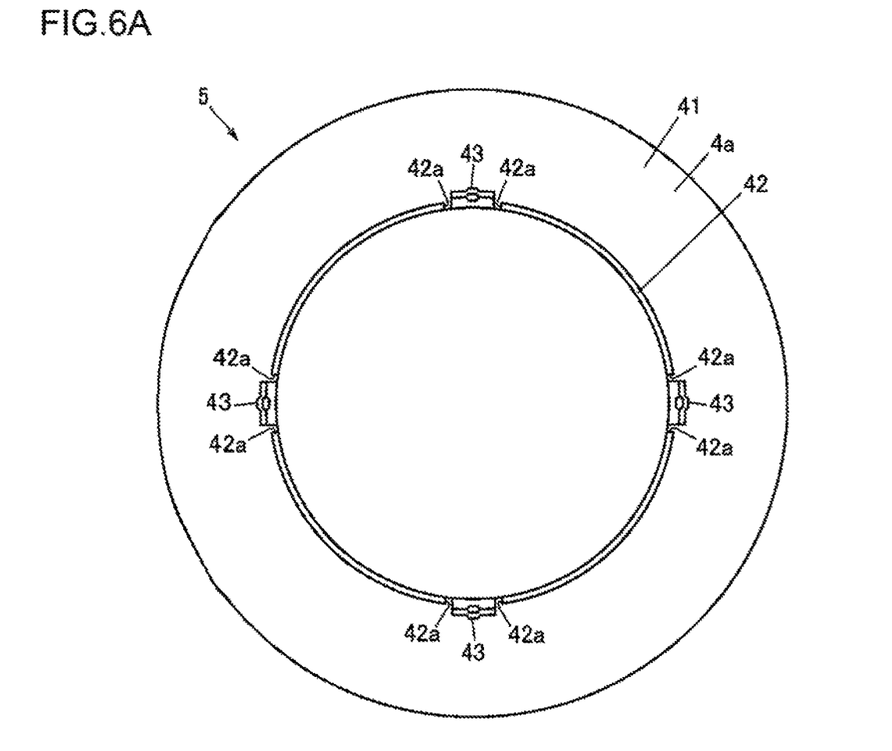
FIG. 6A is a plan view illustrating a shaft washer as viewed from the side of the cage.
Figure 6B:
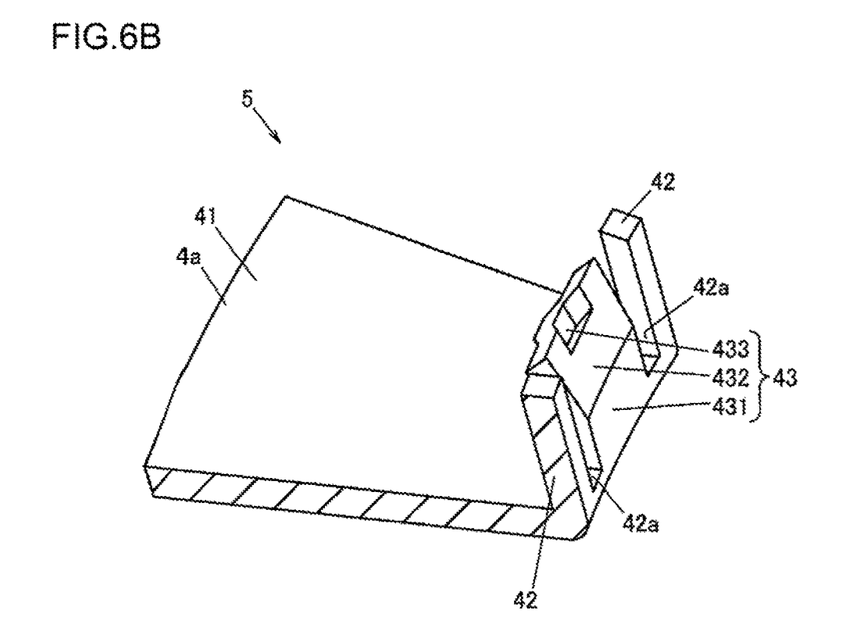
FIG. 6B is a perspective view illustrating a part of the shaft washer.

The housing washer 4 may be formed as follows. First, a punching process of a metal plate is performed to form an annular disc-shaped base 40 as illustrated in FIG. 4A. The plurality of the pairs of slits 42a are also formed in this process. Thereafter, a process of bending the base 40 at a position indicated by a dashed line B in FIG. 4A is performed to form the rib 42 as illustrated in FIG. 4B. In this process, portions of the rib 42 that are to be formed into the hook portions 43 are also bent as in the other portions of the rib 42.

In the embodiment, the plurality of pairs of slits 42a are formed prior to the bending process of the rib 42. This facilitates the bending process. To facilitate the bending process, each of the slits 42a is desirably formed to extend to a position slightly radially inside of the dashed line B, which is a bending starting position (see FIG. 4A), (so that the slit 42a extends to a position within a curved portion in the bending process of the rib 42). In a vehicle transmission or the like, because the thrust roller bearing 1 is often disposed in a passage of lubricating oil, it is desired that the thrust roller bearing 1 allows the lubricating oil to flow rather than causing the lubricating oil to stay. Providing the slits 42a in the rib 42 can also lead to enhancement of fluidity of the lubricating oil. Thus, the slits 42a have a function of defining the hook portions 43, a function of facilitating the bending process of the rib 42, and a function of enhancing fluidity of the lubricating oil.

Thereafter, the portion (the portion between the pair of the slits 42a) of the rib 42 is bent radially inward at a position indicated by a dashed line C in FIG. 4B to form the third projecting portion 433. The bending process at the dashed line C and the forming process of the third projecting portions 433 can be performed simultaneously by a pressing process using a press machine having a radial die, for example. The housing washer 4 is obtained in this manner.

The embodiment describes an example in which the invention is applied to the housing washer 4 including the short-cylinder-shaped rib 42 extending in the axial direction from the outer radial end portion of the raceway portion 41 as the washer. Alternatively, as illustrated in FIGS. 5A to 6B, the invention may be applied to a shaft washer 5 including the short-cylinder-shaped rib 42 extending in the axial direction from an inner radial end portion of the raceway portion 41 as the washer. When the shaft washer 5 serves as the washer, the hook portion 43 includes the first projecting portion 431, the second projecting portion 432, and the third projecting portion 433. The first projecting portion 431 extends toward the second axial side (an upper side of FIG. 5A) from the raceway portion 41. The second projecting portion 432 extends radially outward (toward the rollers 2) and toward the second axial side from the end portion of the first projecting portion 431 on the second axial side. The third projecting portion 433 extends radially outward (toward the rollers 2) from the end portion of the second projecting portion 432 on the side opposite to the first projecting portion 431.

Although not illustrated, the thrust roller bearing 1 may include both the housing washer 4 and the shaft washer 5. In this case, the hook portions 43 may be formed on both the housing washer 4 and the shaft washer 5 or, alternatively, on only one of the housing washer 4 and the shaft washer 5. Because an influence of manufacturing tolerances or the like increases in radially outside portions, it is desirable to form the hook portions 43 on the housing washer 4. When the hook portions 43 are formed on only one of the housing washer 4 and the shaft washer 5, staking may be applied to the edge portion of the rib 42 of the other one of the housing washer 4 and the shaft washer 5.

In the thrust roller bearing 1 according to the embodiment described above, the hook portion 43 includes the first projecting portion 431, the second projecting portion 432, and the third projecting portion 433. The first projecting portion 431 extends toward the second axial side from the raceway portion 41. The second projecting portion 432 extends radially toward the rollers 2 and toward the second axial side from the end portion of the first projecting portion 431 on the second axial side. The third projecting portion 433 further extends radially toward the rollers 2 from the end portion of the second projecting portion 432 on the side opposite to the first projecting portion 431. When the thrust roller bearing 1 is configured in this manner, detachment of the cage 3 from the washer can be reduced even when the projecting length of the third projecting portion 433 is small. By setting the projecting length of the third projecting portion 433 to a small value, application of an excessive tensile stress to the distal end of the hook portion 43 during a process of forming the hook portion 43 can be reduced and, accordingly, production of a crack can be reduced. As a result, appearance defect resulting from production of a crack and production of a fragment can be reduced, and disposal cost due to cracking of the hook portions 43 can be reduced.

Although the invention has been described as related to the embodiments, it is to be understood that the embodiments do not limit the scope of the claims of the invention. It should be noted that not all of the combinations of the features described in the embodiments are essential to solving the problem to be solved by the invention.

It is to be understood that various modifications can be made to the invention without departing from the spirit thereof. For example, in the embodiment described above, the slits 42*a* extend to a connecting portion (the curved portion) between the rib 42 and the raceway portion 41. However, the slits 42*a* are not necessarily configured as such. Each of the slits 42*a* only needs to extend to at least a basal end of the second projecting portion 432 (a connecting portion between the first projecting portion 431 and the second projecting portion 432). In other words, the first projecting portion 431 of the hook portion 43 may be connected to a portion around the first projecting portion 431 of the rib 42 in the circumferential direction.

According to the invention, a thrust roller bearing including a washer, in which a crack is less likely to be produced at a distal end of a hook portion that hooks a cage to suppress separation of the cage, can be provided.

What is claimed is:

1. A thrust roller bearing comprising:
a plurality of radially disposed rollers;
an annular cage having a plurality of cage pockets that hold the plurality of rollers in a manner that allows the rollers to roll; and
an annular washer including a raceway surface on which the plurality of rollers roll, wherein the washer includes an annular disc-shaped raceway portion and a plurality of hook portions, the raceway portion having the raceway surface and disposed on a first axial side of the cage, the plurality of hook portions extending toward a second axial side, the second axial side being a side axially opposite to the first axial side, from one of an outer radial end portion and an inner radial end portion of the raceway portion, the radial end portions being end portions in a radial direction, to retain the cage,
each of the hook portions includes
a first projecting portion that extends toward the second axial side from the raceway portion,
a second projecting portion that extends toward the rollers in the radial direction and toward the second axial side from an end portion of the first projecting portion on the second axial side, and
a third projecting portion that further projects toward the rollers in the radial direction from an end portion of the second projecting portion on a side opposite to the first projecting portion, and
each second projecting portion and each third projecting portion radially overlaps the cage.

2. The thrust roller bearing according to claim 1, wherein the washer includes a cylindrical rib that extends toward the second axial side from one of the outer radial end portion and the inner radial end portion,
a plurality of pairs of slits spaced away from each other in a circumferential direction are provided in the rib, each of the slits having an opening on the second axial side, and
the hook portion is formed by plastically deforming a portion of the rib between the pair of the slits.

3. The thrust roller bearing according to claim 2, wherein the hook portion extends toward the second axial side from the outer radial end portion of the raceway portion,
the second projecting portion extends radially inward and toward the second axial side, and
the third projecting portion further projects radially inward from the end portion of the second projecting portion on the side opposite to the first projecting portion.

4. The thrust roller bearing according to claim 3, wherein each second projecting portion is a portion inclined radially inward with respect to the axial direction, and
an inclination angle of each second projecting portion with respect to the axial direction is between 20 degrees and 45 degrees, inclusive.

5. The thrust roller bearing according to claim 1, wherein the hook portion extends toward the second axial side from the outer radial end portion of the raceway portion,
the second projecting portion extends radially inward and toward the second axial side, and
the third projecting portion further projects radially inward from the end portion of the second projecting portion on the side opposite to the first projecting portion.

6. The thrust roller bearing according to claim 5, wherein each second projecting portion is a portion inclined radially inward with respect to the axial direction, and
an inclination angle of each second projecting portion with respect to the axial direction is between 20 degrees and 45 degrees, inclusive.

* * * * *